(12) United States Patent
Hamberger et al.

(10) Patent No.: US 11,936,108 B2
(45) Date of Patent: Mar. 19, 2024

(54) RCS REDUCTION SURFACE, RCS REDUCTION MEMBER, AND RADAR TEST SYSTEM

(71) Applicant: Rohde & Schwarz GmbH & Co. KG, Munich (DE)

(72) Inventors: Gerhard Hamberger, Munich (DE); Steffen Neidhardt, Munich (DE); Frank Gumbmann, Munich (DE); Maximilian Bogner, Munich (DE); Benedikt Simper, Munich (DE); Matthias Beer, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 346 days.

(21) Appl. No.: 17/355,598

(22) Filed: Jun. 23, 2021

(65) Prior Publication Data

US 2022/0037797 A1    Feb. 3, 2022

(30) Foreign Application Priority Data

Jul. 30, 2020   (EP) .................................. 20188691

(51) Int. Cl.
*H01Q 17/00* (2006.01)
*G01S 7/40* (2006.01)
*H01Q 15/14* (2006.01)

(52) U.S. Cl.
CPC ......... *H01Q 17/007* (2013.01); *G01S 7/4004* (2013.01); *H01Q 15/14* (2013.01)

(58) Field of Classification Search
CPC ..... H01Q 17/007; H01Q 15/14; G01S 7/4004
(Continued)

(56) References Cited

U.S. PATENT DOCUMENTS 8,400,348 B1 * 3/2013 Guice ................ G01S 13/88
235/404

FOREIGN PATENT DOCUMENTS

EP    2902799 B1    1/2017

OTHER PUBLICATIONS

Seng, L.Y et al., "Enhanced microwave absorption of rice husk-based pyramidal microwave absorber with different lossy base layer," IET Microwaves, Antennas & Propagation, The Institution of Engineering and Technology, 14:3, 215-222, Jan. 2020.
(Continued)

*Primary Examiner* — Bo Fan
(74) *Attorney, Agent, or Firm* — Christensen O'Connor Johnson Kindness PLLC

(57) ABSTRACT

An RCS reduction surface for reducing a radar cross section of an object is described. The RCS reduction surface comprises at least one absorber portion, wherein the absorber portion is configured to absorb radar waves. The RCS reduction surface further comprises at least one reflecting portion, wherein the reflecting portion is configured to reflect radar waves. A first plane being associated with a top surface of the absorber portion and a second plane being associated with a top surface of the reflecting portion are spaced from each other by a predefined distance. The predefined distance is configured such that radar waves with a predefined wavelength range that are reflected at the absorber portion and at the surface of the reflecting portion interfere destructively with each other. Further, an RCS reduction member and a radar test system are described.

18 Claims, 3 Drawing Sheets

(58) Field of Classification Search
USPC .......................................... 342/4, 445, 423
See application file for complete search history.

(56) References Cited

OTHER PUBLICATIONS

Vinoy, K.J. and R.M. Jha, "Trends in radar absorbing materials technology," Computational Electromagnetics Lab, Aerospace Electronics & Systems Division, National Aerospace Laboratories, Bangalore. India; Sādhanā 20:5, 815-850, Oct. 1995.
Wang, T. et al., "Reflection loss mechanism of single layer absorber for flake-shaped carbonyl-iron particle composite," Journal of Applied Physics, 112, pp. 104903-1 through 104903-6, 2012.
Yan, Y. et al., "Transient Scattering Analysis of an Airfoil and Its RCS reduction by Partially RAM Coating," IEEE, 622-325, 2000.

\* cited by examiner a)

b)

c)

RCS REDUCTION SURFACE, RCS REDUCTION MEMBER, AND RADAR TEST SYSTEM

FIELD OF THE DISCLOSURE

Embodiments of the present disclosure generally relate to an RCS reduction surface for reducing a radar cross section of an object, for example an RCS reduction member. Embodiments of the present disclosure further relate to an RCS reduction member and to a radar test system.

BACKGROUND

Radar devices are used by an increasing amount of different vehicles. While it has been common for a long time to build radar systems into airplanes and ships of different kinds, there is an increasing tendency to use radar devices in land vehicles such as cars and trucks.

The radar devices of these land vehicles are used by different driver assistance systems, e.g. for distance assistants, traffic warning assistants, lane change assistants, night view assistants, etc. Especially if the vehicle has an autonomous driving mode, such radar systems are essential for the functionality of the vehicle.

The radar devices usually have to be tested after fabrication in order to ensure their correct functionality. Typically, radar test systems that simulate a radar target for the radar device are used for these types of tests. These radar test systems comprise a radar target simulator accordingly.

A common problem of these radar test systems are unwanted reflections at surfaces, which may lead to perturbations in a signal measured by the radar test system or by the radar device to be tested.

One common way of mitigating these perturbations is to cover all relevant surfaces of the radar test system with absorber material. However, it has turned out that there are still leftover perturbations in spite of the use of the absorber material.

Thus, there is a need for an RCS reduction surface, an RCS reduction member, and a radar test system having reduced perturbations due to reflections.

SUMMARY

Embodiments of the present disclosure provide an RCS reduction surface for reducing a radar cross section of an object, for example an RCS reduction member. In an embodiment, the RCS reduction surface comprises at least one absorber portion, wherein the absorber portion is configured to absorb radar waves (at least partly). The RCS reduction surface further comprises at least one reflecting portion, wherein the reflecting portion is configured to reflect radar waves. A first plane being associated with a top surface of the absorber portion and a second plane being associated with a top surface of the reflecting portion are spaced from each other by a predefined distance. The predefined distance is configured such that radar waves with a predefined wavelength range that are reflected at the absorber portion and at the reflecting portion interfere destructively with each other.

Therein and in the following, the term "RCS reduction surface" is understood to denote a layer of material having a certain thickness. Accordingly, the term "RCS reduction surface" denotes not only the outermost portion of a material, but rather an outer layer of the corresponding material or object.

Principles of the present disclosure are based on the finding that the radar cross section of an object can be reduced at least with regard to a particular direction, for example with regard to a boresight direction, by combining two types of surface portions, namely the at least one absorber portion and the at least one reflecting portion. Due to the destructive interference, the overall intensity of radar waves reflected by the object is reduced, which corresponds to a reduced radar cross section of the object.

Therein, the object may, in principle, be an arbitrary item or construct, for example an RCS reduction member used by another object. In some embodiments, the object may be established as a component of a radar test system, e.g., as an antenna or an antenna array. As a further example, the object may be established as a land vehicle, such as a car or truck, as an airplane, or as a ship.

Accordingly, the RCS reduction surface may be provided in different fields, for example when dealing with planar antenna structures, for instance microstrip antennas, or even different antenna structures, for instance antenna structures that have a significant surface facing towards a measurement equipment.

The at least one absorber portion and the at least one reflecting portion are spaced from each other such that radar waves, which are reflected at the at least one absorber portion and at the at least one reflecting portion, for example at an outer surface of the at least one reflecting portion, have a path difference of half of the wavelength or a path difference of odd integer multiples of half of the wavelength of the radar waves.

Therein, the reflection at the at least one absorber portion comprises two contributions, namely the contribution of radar waves that are reflected at a top surface of the at least one absorber portion (i.e., at the boundary between air and the absorber material) as well as the contribution of radar waves that are reflected at a bottom surface of the absorber portion (i.e. at the lower boundary of the absorber material), e.g. at a reflecting surface below the absorber portion(s).

Thus, the radar waves that are reflected at the at least one absorber portion are cancelled out at least partially, for example completely, by the radar waves that are reflected at the at least one reflecting portion, for example at the top surface of the at least one reflecting portion.

In other words, according to embodiments of the present disclosure the radar cross section of the object is reduced by providing a mixture of absorber portions and reflecting portions instead of only applying absorber material as a cover for the whole object.

The RCS reduction surface may be established separately from the object in the sense that the object and the RCS reduction surface are not formed out of a common blank.

Accordingly, the RCS reduction surface may be mechanically mounted to the object. Additionally or alternatively, the RCS reduction surface may be applied to the object as a cover in order to reduce the radar cross section of the object.

The at least one absorber portion may consist of an absorber material. Alternatively, the absorber portion may be covered with the absorber material. Therein, any suitable known absorber material being configured to absorb radar waves may be used.

The at least one reflecting portion may consist of a material that is configured to reflect radar waves, e.g. a suitable metal. Alternatively, the reflecting portion may be covered with the reflecting material.

Generally, the top surfaces are (substantially) parallel with respect to each other. Put differently, the top surfaces face a similar direction or rather they are orientated towards the same direction.

Accordingly, the respective planes are parallel with respect to each other. In other words, the respective planes are not inclined.

According to an aspect of the present disclosure, the predefined distance is dependent on a wavelength of the radar waves. In other words, the predefined distance is configured such that destructive interference occurs based on the wavelength of the radar waves.

If the radar waves do not have a constant wavelength, e.g., because the corresponding radar signal comprises a chirp, an average wavelength of the radar waves may be used in order to determine the predefined distance.

Usually, the wavelength deviation of the radar waves due to the chirp is small compared to the absolute wavelength, and thus the wavelength deviation affects the destructive interference described above only marginally, for example in a negligible manner.

Thus, without restriction of generality, the wavelength of the radar waves will be treated as being constant in the following.

According to another aspect of the present disclosure, the predefined distance is equal to $$\frac{2n+1}{4}\lambda_0,$$

for example equal to $$\frac{2n+1}{4}\lambda_0 \cdot \cos(\theta),$$

wherein $\lambda_0$ is the wavelength of the radar waves in air, wherein $\theta$ is a predefined incident angle, and wherein n is an integer bigger than or equal to zero. If the radar waves are in boresight direction, then the incident angle $\theta$ is equal to zero.

Due to this choice of the predefined distance between the planes, the total path difference between the radar waves that are reflected at the absorber portion and radar waves that are reflected at the reflecting portion is half of the wavelength or an odd integer multiple of half of the wavelength, which is the condition for destructive interference.

According to an aspect of the present disclosure, the absorber portion is configured as a destructive interference absorber, as a loss-based absorber, and/or as a metamaterial-based absorber. Accordingly, the absorber portion may be configured to attenuate radar waves by means of destructive interference, by attenuation due to electromagnetic losses, or via a combination of both. In some embodiments, the absorber is made of a metamaterial, thereby blocking and/or absorbing the radar waves that impinge on the absorber portion made of the metamaterial.

In a further embodiment of the present disclosure, the absorber portion has a predefined thickness, wherein the predefined thickness is dependent on a wavelength of the radar waves. In some embodiments, the predefined thickness is configured such that destructive interference occurs between radar waves that are reflected at a top surface of the respective absorber portion (i.e., at the boundary between air and the absorber material) and radar waves that are reflected at a bottom surface of the absorber portion (i.e., at the lower boundary of the absorber material). In other words, the at least one absorber portion may be established as a destructive interference absorber.

In some embodiments, the predefined thickness is dependent on an incident angle. In some embodiments, the predefined thickness may be maximal for an incident angle of 0°, and may become smaller with increasing incident angle.

According to another aspect of the present disclosure, the predefined thickness is equal to $$\frac{2m+1}{4}\lambda_{abs},$$

for example equal to $$\frac{2m+1}{4}\lambda_{abs} \cdot \cos(\theta),$$

wherein $\lambda_{abs}$ is the wavelength of the radar waves within the absorber portion, wherein $\theta$ is the incident angle, and wherein m is an integer bigger than or equal to zero. If the radar waves are in boresight direction, then the incident angle $\theta$ is equal to zero, resulting in $\cos(\theta)$ being equal to 1.

Due to this choice of the predefined thickness, the total path difference between the radar waves that are reflected at the top surface of the absorber portion and radar waves that are reflected at the bottom surface of the absorber portion is half of the wavelength or an odd integer multiple of half of the wavelength, which is the condition for destructive interference.

Generally, the reflecting portion may be at least partially covered by the absorber portion.

In a further embodiment of the present disclosure, a total area of the at least one absorber portion, for example portions being covered with absorber material, and a total area of the at least one reflecting portion, for example portions being covered with reflecting material, have a predefined ratio, wherein the predefined ratio is dependent on an absorbance of the at least one absorber portion. The predefined ratio determines the overall intensity of radar waves reflected by the RCS reduction surface. Conversely, the radar cross section of an object can be reduced by choosing a suitable predefined ratio.

In some embodiments, the predefined ratio is configured such that an overall intensity of a radar wave that is reflected by said RCS reduction surface is minimized. The corresponding predefined ratio may be determined via suitable simulations of the RCS reduction surface and/or via suitable experiments. The experiments may be performed by using a reference object having the RCS reduction surface.

For example, a reflectivity ratio between a reflectivity of the absorber portion(s) and a reflectivity of the reflecting portion(s) may be determined, for example by performing tests and/or simulations. Then, the predefined ratio may be determined based on the reflectivity ratio.

Accordingly, the ratio between the reflectivity of absorber portion(s), namely an object 1 with an area A covered with the absorber material, and the reflectivity of the reflection portion(s), namely an object 2 with an area A having just the reflecting material, can be used to determine the respective areas used in the RCS reduction surface, namely the mixture of absorber material and reflecting material.

According to another aspect of the present disclosure, a summed intensity of radar waves reflected at the at least one absorber portion is equal to a summed intensity of radar waves reflected at the at least one reflecting portion. It is noted that these summed intensities have to be equal after attenuation due to the absorber material and/or after attenuation due to the destructive interference between the radar waves reflected at the top surface and at the bottom surface of the at least one absorber portion described above.

Accordingly, the overall surface area of the reflecting portion generally is smaller than the overall surface area of the absorber portion, as the power density of the radar waves reflected at the at least one absorber portion is smaller than the power density of the radar waves reflected at the at least one reflecting portion.

The RCS reduction surface may comprise several absorber portions, for example several portions being covered with an absorber material, and several reflecting portions, for example several portions being covered with the reflecting material, wherein the absorber portions and the reflecting portions are arranged in local clusters. This way, the angular behavior of the RCS reduction surface and/or the overall absorption may be improved.

In some embodiments, a total area of the absorber portion(s) and a total area of the reflecting portion(s) of each local cluster may each have the predefined ratio explained above in order to minimize an overall intensity of radar waves reflected by the RCS reduction surface.

Alternatively, the total area of the absorber portion(s) and a total area of the reflecting portion(s) of each local cluster may have a ratio that is different for each local cluster.

This way, an angular dependency of impinging radar waves can be taken into account appropriately which deviates from a perpendicular impingement, namely in boresight direction.

Moreover, the radar waves reflected at said absorber portion may comprise contributions of radar waves reflected at a reflective material below a absorber material. In some embodiments, the absorber material may be placed on the reflective material that inter alia establishes the reflecting portion. Put differently, the absorber material is provided on the reflective material, thereby establishing the absorber portion. The radar waves may impinge on the surface of the absorber portion, thereby propagating through the absorber material such that they impinge on the surface of the reflective material below the absorber material where the radar waves are reflected. Accordingly, the radar waves reflected at said absorber portion have a contribution based on reflections at the reflective material.

Embodiments of the present disclosure further provide an RCS reduction member, comprising an RCS reduction surface described above.

The RCS reduction member may comprise a carrier and the RCS reduction surface located on the carrier. The carrier may be established by the same material of the reflection portion. Moreover, the RCS reduction member may further comprise a carrier layer to which the RCS reduction surface, i.e. the absorber portion(s) and the reflecting portion(s), may be mounted or onto which the RCS reduction surface is coated, for example wherein the carrier layer is made by a different material.

Regarding the advantages and further properties of the RCS reduction member, reference is made to the explanations given above with respect to the RCS reduction surface, which also hold for the RCS reduction member and vice versa.

Embodiments of the present disclosure further provide a radar test system, comprising at least one radar test antenna, wherein at least one surface of the radar test system is covered with an RCS reduction surface described above or with an RCS reduction member described above.

Regarding the advantages and further properties of the radar system, reference is made to the explanations given above with respect to the RCS reduction surface, which also hold for the radar system and vice versa.

The at least one radar test antenna may be established as a horn antenna, for example as a planar horn antenna. However, the at least one radar test antenna may be established as any other type of suitable radar antenna.

According to an aspect of the present disclosure, the radar test system comprises an antenna array having several radar test antennas. For example, the radar system may be configured to simulate one or several radar targets via the several radar test antennas.

The radar test system may further comprise a device under test, wherein the device under test comprises a radar system, and wherein a surface of the at least one radar test antenna or a surface of the antenna array facing the device under test is covered with the RCS reduction surface or with the RCS reduction member. Thus, perturbations due to reflections at the side of the antenna or at the side of the antenna array facing the device under test are reduced, for example minimized. Thus, the device under test receives less perturbations due to reflections within the radar test system.

According to another aspect of the present disclosure, the radar test system is established as an automotive radar test system. Accordingly, the radar test system may be configured to simulate a radar target for a device under test, wherein the device under test may be an automotive radar that is built into a vehicle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Figure 1:
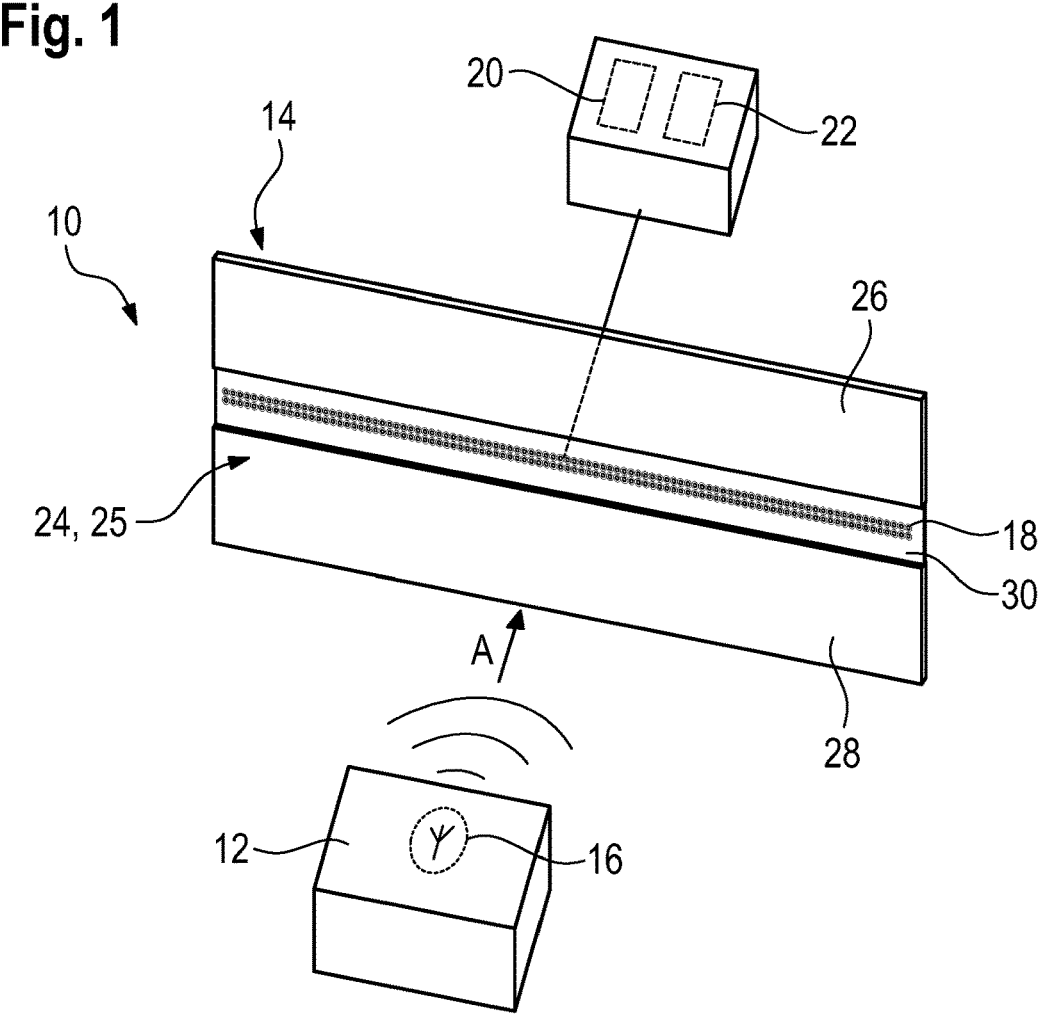
FIG. 1 schematically shows a representative radar system according to one or more principles of the present disclosure.

FIG. 1 schematically shows a representative radar test system 10 comprising a device under test 12 and an antenna array 14. It is noted that the device under test 12 is illustrated only abstractly in FIG. 1, as the device under test 12 may actually be established as one of several different types of radar devices. For example, the device under test 12 may be a radar device that is built into a vehicle, for example into a car or a truck.

In some embodiments, the device under test 12 may be part of a driver assistance system, such as a distance assistant or a night view assistants, or of an autonomous driving system of the vehicle. However, the explanations given in the following generally also apply to other types of devices under test 12 and/or to other vehicles, such as airplanes or ships.

In general, the entire concept described herein can be used in many different fields that deal with (planar or differently shaped) antennas or antenna structures as well as radar cross section (RCS) reduction. In some embodiments, any disturbance due to a high radar cross section of the antenna (structure) can be minimized or rather avoided in an appropriate manner.

In general, the device under test 12 comprises at least one radar antenna 16 that is configured to transmit and/or receive radio waves in at least one predefined frequency spectrum. In some embodiments, the at least one predefined frequency spectrum comprises at least one frequency band between 1 GHz and 150 GHz. For example, the at least one predefined frequency spectrum comprises a frequency band between 60 GHz and 90 GHz, for example between 76 GHz and 77 GHz and/or between 77 GHz and 81 GHz, which are typically used for automotive radar systems. Hence, the frequency range for automotive radar testing may be used in some embodiments. Of course, the device under test 12 may comprise several radar antennas 16 that are each configured to transmit and/or receive radar waves.

The antenna array 14 of the test system 10 comprises several radar test antennas 18 that are configured to transmit and/or receive radio waves in at least one predefined frequency band. In some embodiments, the antennas 18 are configured to transmit and/or receive radio waves in the same frequency band as the at least one radar antenna 16 of the device under test 12.

In general, the radar test system 10 is configured to conduct certain tests on the device under test 12. For example, the radar test system 10 is configured to simulate a radar target for the device under test 12. Accordingly, the radar test system 10 comprises a radar target simulator.

Accordingly, the device under test 12 may generate a radar signal by the antenna 16. The radar signal is received via the individual antennas 18 of the antenna array 14. The antennas 18 generate corresponding input signals, which are then forwarded to an evaluation circuit 20 and/or to a control circuit 22 that are connected to the antenna array 14 in a signal transmitting manner.

In some embodiments, the evaluation circuit 20 and the control circuit 22 may be established by a single circuit, namely a control and/or analysis circuit, for example a control and/or analysis device. The evaluation circuit 20 analyzes the input signal received from the antenna array 14 and determines a suitable response signal to be generated via the antenna array 14. The control circuit 22 then controls the antenna array 14 to generate and transmit the response signal over the air.

The response signal are then received via the antenna 16 of the device under test 12, and may be evaluated by the device under test 12, e.g., by an evaluation circuit of the device under test 12, thereby generating measurement data. By reading out the measurement data generated by the device under test 12, the performance of the device under test 12 can be evaluated.

Radar test systems as the one described above usually face the problem that there are additional perturbation signals that result from reflections within the radar test system 10, for example from reflections at the antenna array 14. For example, the radar signal generated by the device under test 12 may be reflected at a surface of the antenna array 14 facing the device under test 12. Thus, the device under test 12 does not only receive the response signal that is generated by the antenna array 14 when simulating an appropriate target for testing purposes, but also the additional perturbation signals due to the reflections at the antenna array 14.

In order to minimize these perturbations, the antenna array 14 comprises an RCS reduction member 24 having an RCS reduction surface 25 on a side of the antenna array 14 that is facing the device under test 12. The RCS reduction member 24 is shown in more detail in FIG. 2, which shows a cross-section of the RCS reduction member 24.

The RCS reduction member 24 or rather the RCS reduction surface 25 comprises a first absorber portion 26, a second absorber portion 28, and a reflecting portion 30. The reflecting portion 30 is provided in a center region of the antenna array 14, namely in a region surrounding the antennas 18 of the antenna array 14. The absorber portions 26, 28 are each provided at an outer region of the antenna array 14 spanning from the reflecting portion 30 to the edges of the antenna array 14.

Figure 2:
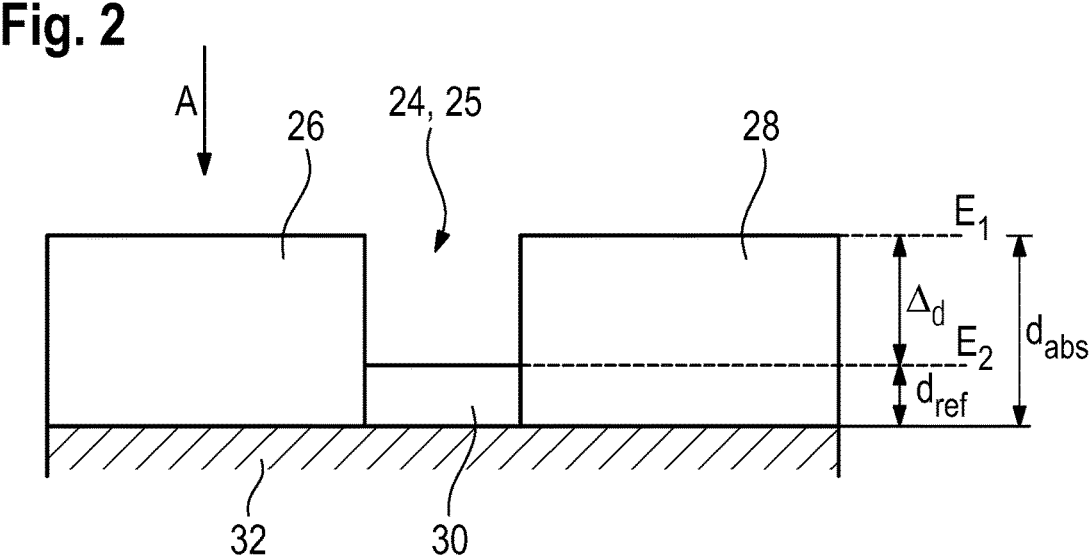
FIG. 2 schematically shows a cross section of an RCS reduction member according to an embodiment of the present disclosure.

In the exemplary embodiment shown in FIG. 2, the RCS reduction member 24 is mounted directly to a surface of a base plate 32 of the antenna array 14, e.g., by at least one of gluing, riveting, bolting, etc. However, it is to be understood that the RCS reduction member 24 may also comprise a carrier layer to which the RCS reduction surface, i.e., the absorber portions 26, 28 and the reflecting portion 30, may be mounted.

In general, the first absorber portion 26 and the second absorber portion 28 each are formed as a layer of absorber material that is configured to absorb or rather attenuate radar waves. Therein, the absorber material may be any suitable material known in the state of the art or future developed.

Generally, the absorber material may be configured as a destructive interference absorber, as a loss-based absorber, and/or as a metamaterial-based absorber. Accordingly, the absorber portions 26, 28 may be configured to attenuate radar waves by destructive interference.

Alternatively or additionally, the absorber portions 26, 28 attenuate radar waves by attenuation due to electromagnetic losses when the radar waves propagate through the respective material. Furthermore, a combination of both may be used, namely a combination of destructive interference and electromagnetic losses.

Moreover, the absorber material may be a metamaterial that has the respective characteristics used for attenuating the radar waves.

Without restriction of generality, the case of a destructive interference absorber will be described in the following. The first absorber portion 26 and the second absorber portion 28 each have a predefined thickness $d_{abs}$. The predefined thickness $d_{abs}$ is chosen based on a wavelength of the radar waves that are to be absorbed or rather attenuated.

In some embodiments, the predefined thickness $d_{abs}$ is chosen dependent on the wavelength of the radar waves within the absorber material, such that radar waves that are reflected at a top surface of the respective absorber portions 26, 28 (i.e., at the boundary between air and the absorber material) and radar waves that are reflected at a bottom surface of the absorber portion 26, 28 (i.e., at the boundary between the absorber material and the base plate 32) cancel each other at least partially due to destructive interference.

Accordingly, the predefined thickness $d_{abs}$ is an odd integer multiple of $$\frac{\lambda_{abs}}{4},$$

wherein $\lambda_{abs}$ is the wavelength of the radar waves within the absorber material. Thus, the predefined thickness $d_{abs}$ is given by $$d_{abs} = \frac{2m+1}{4}\lambda_{abs},$$

wherein m is an integer bigger than or equal to zero.

It is noted that this is the correct formula if the radar waves to be attenuated are perpendicular to the surface of the respective absorber portion 26, 28 in boresight direction A.

If the radar waves to be absorbed are under an angle θ, then the predefined thickness may have to be adjusted to $$\frac{2m+1}{4}\lambda_{abs}\cdot\cos(\theta).$$

If the radar waves do not have a constant wavelength, e.g. because the device under test 12 generates radar waves with a chirp, an average wavelength of the radar waves may be used. Usually, the wavelength deviation of the radar waves due to the chirp is small compared to the absolute wavelength, and thus the wavelength deviation affects the destructive interference described above only marginally.

Thus, without restriction of generality, the wavelength of the radar waves will be treated as being constant in the following.

In general, the reflecting portion 30 is configured to reflect radar waves. Accordingly, the reflecting portion 30 may consist of a radar reflecting material, such as a suitable metal.

Alternatively, a top surface of the reflecting portion 30 may be coated with a radar reflecting material, e.g. with a suitable metal.

The reflecting portion 30, or rather a top surface of the reflecting portion 30, has a predefined distance Δd with respect to the top surfaces of the absorber portions 26, 28.

More precisely, a plane $E_1$ being associated with the top surfaces of the absorber portions 26, 28 and a plane $E_2$ being associate with a top surface of the reflecting portion 30 are spaced apart from each other by the predefined distance Δd.

Therein, the predefined distance Δd is chosen such that radar waves that are reflected at the absorber portions 26, 28, for example at the top surface of the absorber portions 26, 28, and radar waves that are reflected at the top surface of the reflecting portion 30 (i.e. at the boundary between air and metal) cancel each other at least partially due to destructive interference.

Accordingly, the predefined distance Δd is an odd integer multiple of $$\frac{\lambda_0}{4},$$

wherein $\lambda_0$ is the wavelength of the radar waves within the absorber material. Thus, the predefined distance Δd is given by $$\Delta d = \frac{2n+1}{4}\lambda_{abs},$$

wherein n is an integer bigger than or equal to zero.

It is noted that this is the correct formula if the radar waves to be attenuated are perpendicular to the surface of the respective absorber portions 26, 28 and the reflecting portion 30, i.e. in boresight direction A.

If the radar waves that are to be attenuated are under an angle θ, then the predefined distance may have to be adjusted to $$\Delta d = \frac{2n+1}{4}\lambda_0\cdot\cos(\theta).$$

Without restriction of generality, the case of the radar waves to be attenuated inciding in boresight direction A will be described in the following.

Due to the conditions on the predefined distance Δd and the predefined thickness $d_{abs}$ described above, the reflecting portion 30 must have a thickness $d_{ref}=d_{abs}\pm\Delta d$.

It is noted that only the case $d_{ref}=d_{abs}-\Delta d$ is shown in FIG. 2, i.e. the case where the thickness $d_{ref}$ of the reflecting portion 30 is smaller than the thickness $d_{abs}$ of the absorber portions 26, 28.

However, the case $d_{ref}=d_{abs}+\Delta d$ is also conceivable, wherein the reflecting portion 30 is thicker than the absorber portions 26, 28.

In order to minimize an overall intensity of radar waves that are reflected by the RCS reduction surface 25 in boresight direction A, a total area of the absorber portions 26, 28 and a total area of the reflecting portion(s) 30 have a predefined ratio.

In general, an overall intensity of radar waves reflected at the absorber portions 26, 28 (after attenuation due to the absorber material and due to the destructive interference between the radar waves reflected at the top surface and at the bottom surface of the absorber portions 26, 28 described above) has to match an overall intensity of radar waves that are reflected at the reflecting portion 30 in order to minimize the overall intensity of radar waves reflected by the RCS reduction surface 25.

Thus, the predefined ratio depends on an absorbance of the absorber material of the absorber portions 26, 28.

The overall surface area of the absorber portions 26, 28 and the overall surface area of the reflecting portion(s) 30, and thus the predefined ratio, may be determined via a simulation of the radar test system 10, or rather a simulation of the radar properties of the RCS reduction member 24, for example of the RCS reduction surface 25.

FIG. 3a, 3b, 3c show the respective simulations of a reflectivity of the reflecting portion(s) 30 (FIG. 3a), a reflectivity of the absorber portion(s) 26, 28 (FIG. 3b), and a reflectivity of the resulting RCS reduction member 24 (FIG. 3c).

Figure 3:
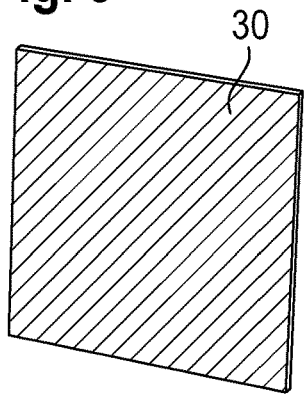
FIG. 3 show diagrams of a reflectivity of (a) a reflecting portion, (b) of an absorber portion, and (c) of an RCS reduction surface according to an embodiment of the present disclosure.
Figure 3:
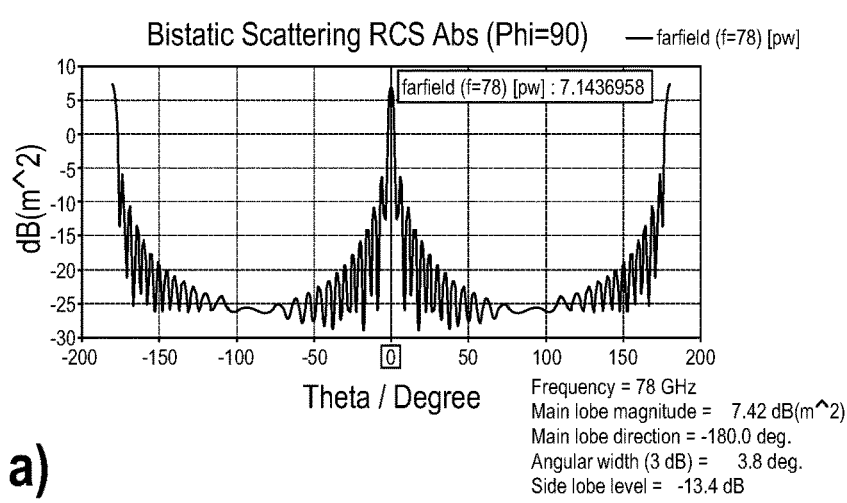
Figure 3:
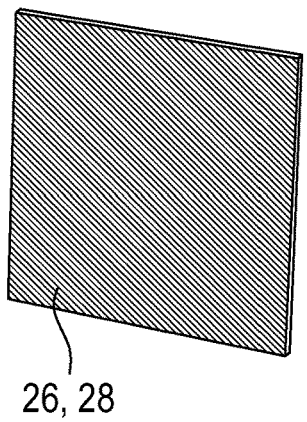
Figure 3:
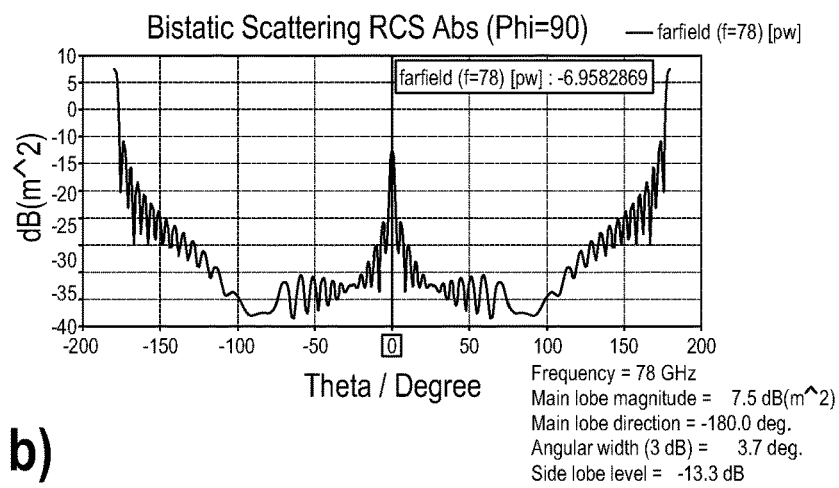
Figure 3:
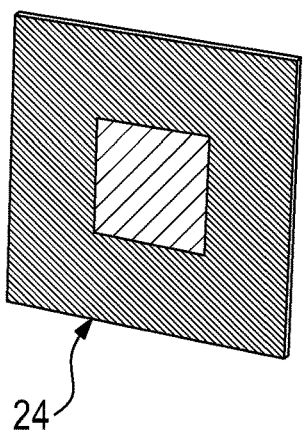
Figure 3:
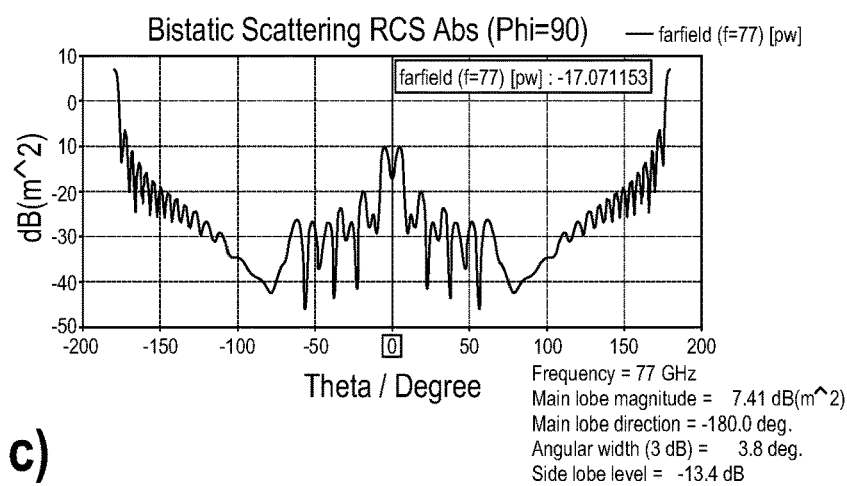

As can clearly be seen in FIG. 3, the reflectivity of the RCS reduction surface 24 has a local minimum in boresight direction, i.e. at θ=0.

For example, a reflectivity ratio between a reflectivity of the absorber portion(s) 26, 28 and a reflectivity of the reflecting portion(s) 30 may be determined based on the simulations.

Then, the predefined ratio concerning the areas may be determined based on the reflectivity ratio obtained from the simulations.

In some embodiments, a RCS ratio between a radar cross section of the absorber portions 26, 28 and a radar cross section of the reflecting portion(s) 30 may be determined based on the reflectivity ratio, and the predefined ratio may be determined based on the RCS ratio.

Moreover, FIG. 3 shows that the angular reflectivity is homogenized in an angular area about the boresight direction at θ=0 compared to the reflectivity of the reflecting portion(s) 30 (FIG. 3a) and the reflectivity of the absorber portion(s) 26, 28 (FIG. 3b).

In a similar manner, the ratio may be determined based on the absorbance of the reflecting portions(s) 30 and the absorbance of the absorber portions(s) 30 since the absorbance can be unambiguously determined based on the reflectivity and vice versa.

Alternatively, the predefined ratio may be determined in suitable experiments.

Figure 4:
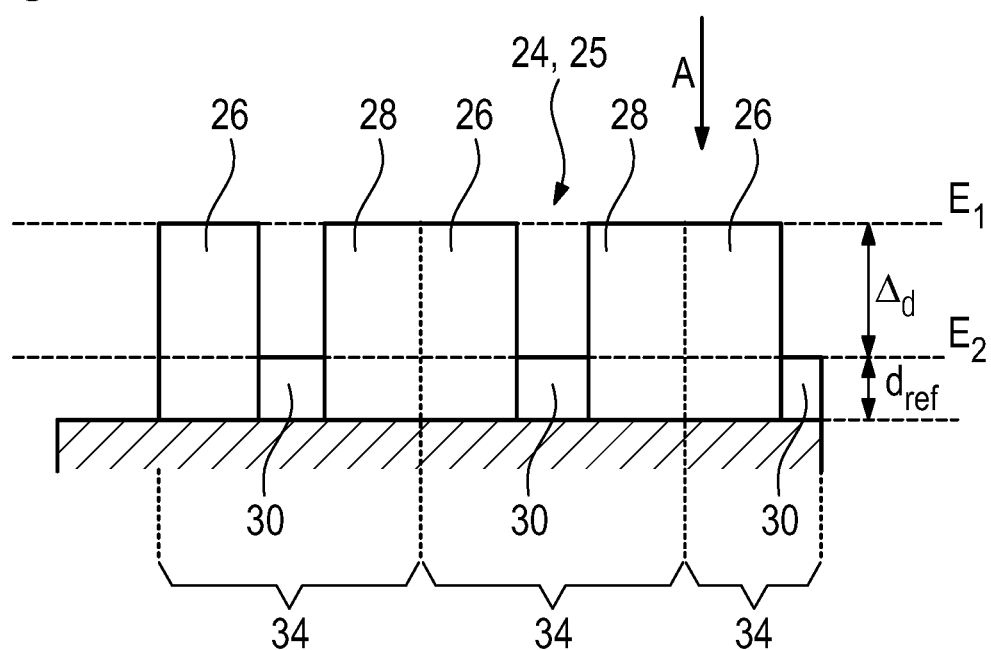
FIG. 4 schematically shows a cross section of an RCS reduction member according to another embodiment of the present disclosure.

FIG. 4 shows a further embodiment of the RCS reduction member 24 and of the RCS reduction surface 25, wherein only the differences compared to the embodiment shown in FIG. 2 are described in the following.

The RCS reduction member 24 or rather the RCS reduction surface 25 comprises several local clusters 34 that each comprise a first absorbing portion 26, a second absorbing portion 28 and/or a reflecting portion 30.

Otherwise, the explanations given above also apply to the embodiment of the RCS reduction member 24 and of the RCS reduction surface shown in FIG. 3.

In some embodiments, a total area of the absorber portions 26, 28 and a total area of the reflecting portion(s) 30 of each local cluster 34 may each have the predefined ratio explained above in order to minimize an overall intensity of radar waves reflected by the RCS reduction surface.

Alternatively, the total area of the absorber portions 26, 28 and a total area of the reflecting portion(s) 30 of each local cluster 34 may have a ratio that is different for each local cluster 34.

It is noted that while the RCS reduction member 24 and the RCS reduction surface 25 are described in the context of the radar test system 10, or more precisely in the context of the antenna array 14, the RCS reduction member 24 and the RCS reduction surface 25 are not limited to that particular application.

In principle, surfaces of arbitrary objects could be provided with the RCS reduction surface 25 in order to reduce their radar cross section, for example outer surfaces of land vehicles, airplanes, or ships.

Moreover, while the outer surfaces of the RCS reduction surface 25 are depicted as flat in FIGS. 1 to 3, the outer surfaces of the RCS reduction surface 25 may also be curved and/or cornered.

In general, the absorber portion(s) 26, 28 may be located on the material of the reflection portion(s) 30 such that the predefined thickness $d_{abs}$ of the absorber portion(s) 26, 28 corresponds to the predefined distance $\Delta d$.

In other words, the material of the reflection portion(s) 30 establishes a base material on which the material of the absorber portion(s) 26, 28 is located partly, thereby establishing the respective absorber portion(s) 26, 28 and the reflection portion(s) 30. In some embodiments, this is also illustrated by the dashed line in FIGS. 2 and 3 which indicates the second plane $E_2$ that is associated with the top surface of the reflecting portion(s) 30. Generally, the concept simplifies the manufacturing process of the RCS reduction surface 25 as well as the RCS reduction member 24 since the material of the reflection portion(s) 30 is provided on the base plate 32, on which the material of the reflection portion(s) 30 is applied partly.

However, any reflection contribution from the reflective material under the absorber portion(s) 30 is also considered when identifying the predefined ratio that determines the overall intensity of radar waves reflected by the RCS reduction surface 25.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An RCS reduction surface for reducing a radar cross section of an object, said RCS reduction surface comprising:
    at least one absorber portion, said absorber portion being configured to absorb radar waves; and
    at least one reflecting portion, said reflecting portion being configured to reflect radar waves,
    wherein a first plane being associated with a top surface of said absorber portion and a second plane being associated with a top surface of said reflecting portion are spaced from each other by a predefined distance,
    wherein said predefined distance is configured such that radar waves with a predefined wavelength range that are reflected at said absorber portion and at said reflecting portion interfere destructively with each other,
    wherein a total area of the at least one absorber portion and a total area of the at least one reflecting portion have a predefined ratio, wherein said predefined ratio is dependent on an absorbance of said at least one absorber portion,
    wherein said predefined ratio is configured such that an overall intensity of a radar wave that is reflected by said RCS reduction surface is minimized, and
    wherein a summed intensity of radar waves reflected at the at least one absorber portion is approximately equal to a summed intensity of radar waves reflected at the at least one reflecting portion.

2. The RCS reduction surface of claim 1, wherein said predefined distance is dependent on a wavelength of said radar waves.

3. The RCS reduction surface of claim 2, wherein said predefined distance is equal to $$\frac{2n+1}{4}\lambda_0,$$

or equal to $$\frac{2n+1}{4}\lambda_0 \cdot \cos(\theta),$$

wherein $\lambda_0$ is the wavelength of said radar waves in air, wherein $\theta$ is a predefined incident angle, and wherein n is an integer bigger than or equal to zero.

4. The RCS reduction surface according to claim 1, wherein the absorber portion is established as a destructive interference absorber, as a loss-based absorber, and/or as a metamaterial-based absorber.

5. The RCS reduction surface according to claim 1, wherein the absorber portion has a predefined thickness, wherein said predefined thickness is dependent on a wavelength of said radar waves, particularly dependent on an incident angle.

6. The RCS reduction surface of claim 5, wherein said predefined thickness is equal to $$\frac{2m+1}{4}\lambda_{abs} \text{ or to to } \frac{2m+1}{4}\lambda_{abs} \cdot \cos(\theta),$$

wherein $\lambda_{abs}$ is the wavelength of said radar waves within said absorber portion, wherein $\theta$ is said incident angle, and wherein m is an integer bigger than or equal to zero.

7. The RCS reduction surface according to claim 1, wherein a total area of portions being covered with absorber material and a total area of portions being covered with reflecting material have said predefined ratio.

8. The RCS reduction surface according to claim 1, comprising several absorber portions, and several reflecting portions, wherein said absorber portions and said reflecting portions are arranged in local clusters.

9. The RCS reduction surface according to claim 1, comprising several portions being covered with an absorber material, and several portions being covered with a reflecting material, wherein said portions being covered with said absorber material and said portions being covered with said reflecting material are arranged in local clusters.

10. The RCS reduction surface according to claim 1, wherein the radar waves reflected at said absorber portion comprise contributions of radar waves reflected at a reflective material below a absorber material.

11. An RCS reduction member, comprising an RCS reduction surface according to claim 1.

12. A radar test system, comprising at least one radar test antenna, wherein at least one surface of said radar test system is covered with an RCS reduction surface according to claim 1.

13. A radar test system, comprising at least one radar test antenna, wherein at least one surface of said radar test system includes an RCS reduction member according to claim 11.

14. The radar test system according to claim 12, wherein said radar test system comprises an antenna array having several radar test antennas.

15. The radar test system according to claim 12, further comprising a device under test, wherein said device under test comprises a radar system, and wherein a surface of said at least one radar test antenna or a surface of said antenna array facing said device under test is covered with said RCS reduction surface.

16. The radar test system according to claim 13, further comprising a device under test, wherein said device under test comprises a radar system, and wherein a surface of said at least one radar test antenna or a surface of said antenna array facing said device under test includes said RCS reduction member.

17. An RCS reduction surface for reducing a radar cross section of an object, said RCS reduction surface comprising:
   at least one absorber portion, said absorber portion being configured to absorb radar waves; and
   at least one reflecting portion, said reflecting portion being configured to reflect radar waves,
   wherein a first plane being associated with a top surface of said absorber portion and a second plane being associated with a top surface of said reflecting portion are spaced from each other by a predefined distance, and
   wherein said predefined distance is configured such that radar waves with a predefined wavelength range that are reflected at said absorber portion and at said reflecting portion interfere destructively with each other, wherein said predefined distance is dependent on a wavelength of said radar waves, wherein said predefined distance is approximately equal to $$\frac{2n+1}{4}\lambda_0,$$

or approximately equal to $$\frac{2n+1}{4}\lambda_0 \cdot \cos(\theta),$$

wherein $\lambda_0$ is the wavelength of said radar waves in air, wherein $\theta$ is a predefined incident angle, and wherein n is an integer bigger than or equal to zero.

18. An RCS reduction surface for reducing a radar cross section of an object, said RCS reduction surface comprising:
   at least one absorber portion, said absorber portion being configured to absorb radar waves; and
   at least one reflecting portion, said reflecting portion being configured to reflect radar waves,
   wherein a first plane being associated with a top surface of said absorber portion and a second plane being associated with a top surface of said reflecting portion are spaced from each other by a predefined distance,
   wherein said predefined distance is configured such that radar waves with a predefined wavelength range that are reflected at said absorber portion and at said reflecting portion interfere destructively with each other, and
   wherein a summed intensity of radar waves reflected at the at least one absorber portion is approximately equal to a summed intensity of radar waves reflected at the at least one reflecting portion.

* * * * *